Jan. 17, 1939.  J. C. BUCKBEE  2,144,360
PORTABLE CONVEYER
Filed June 5, 1935  2 Sheets-Sheet 2
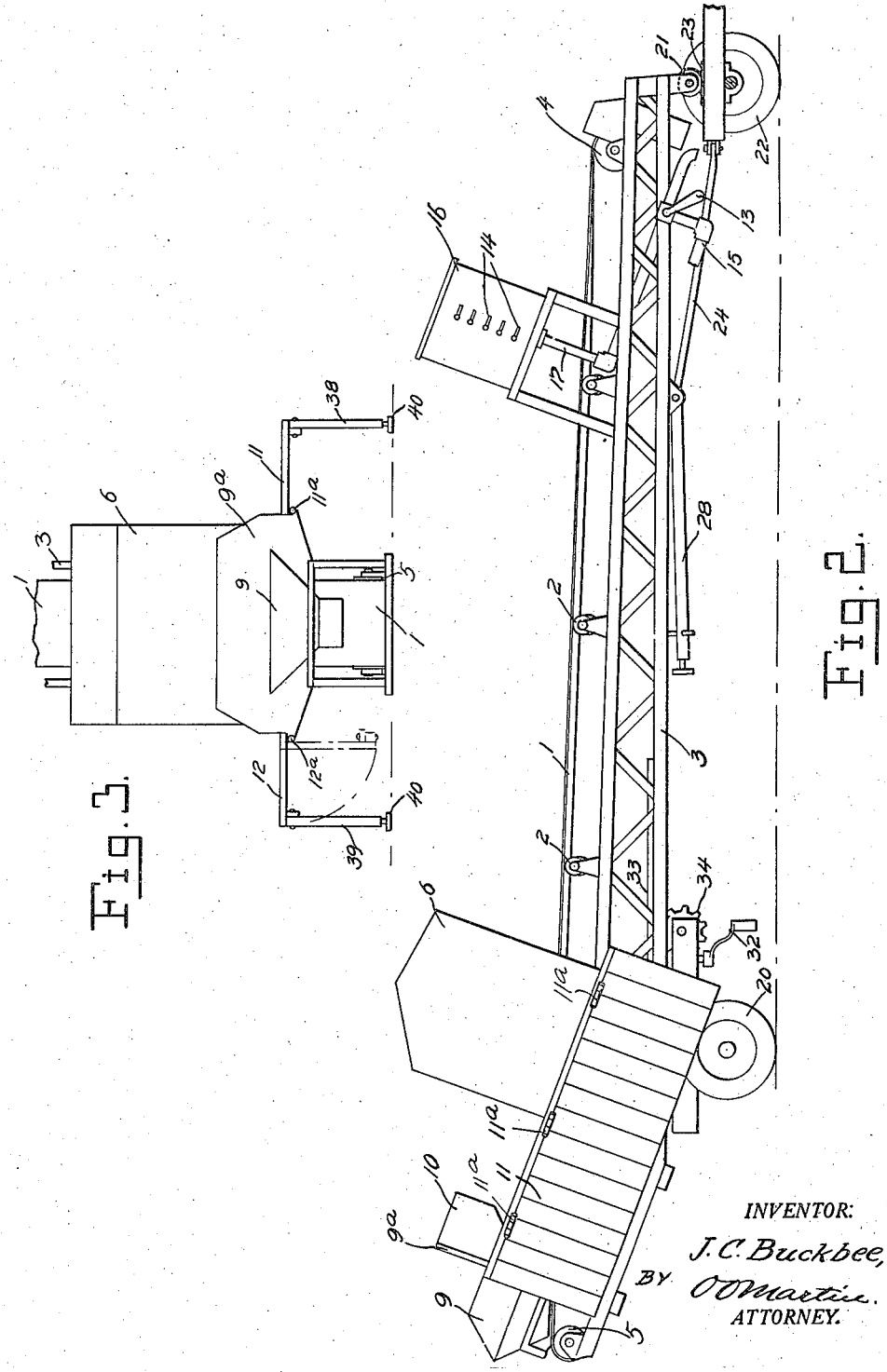
INVENTOR:
J. C. Buckbee,
BY O. O. Martin
ATTORNEY.

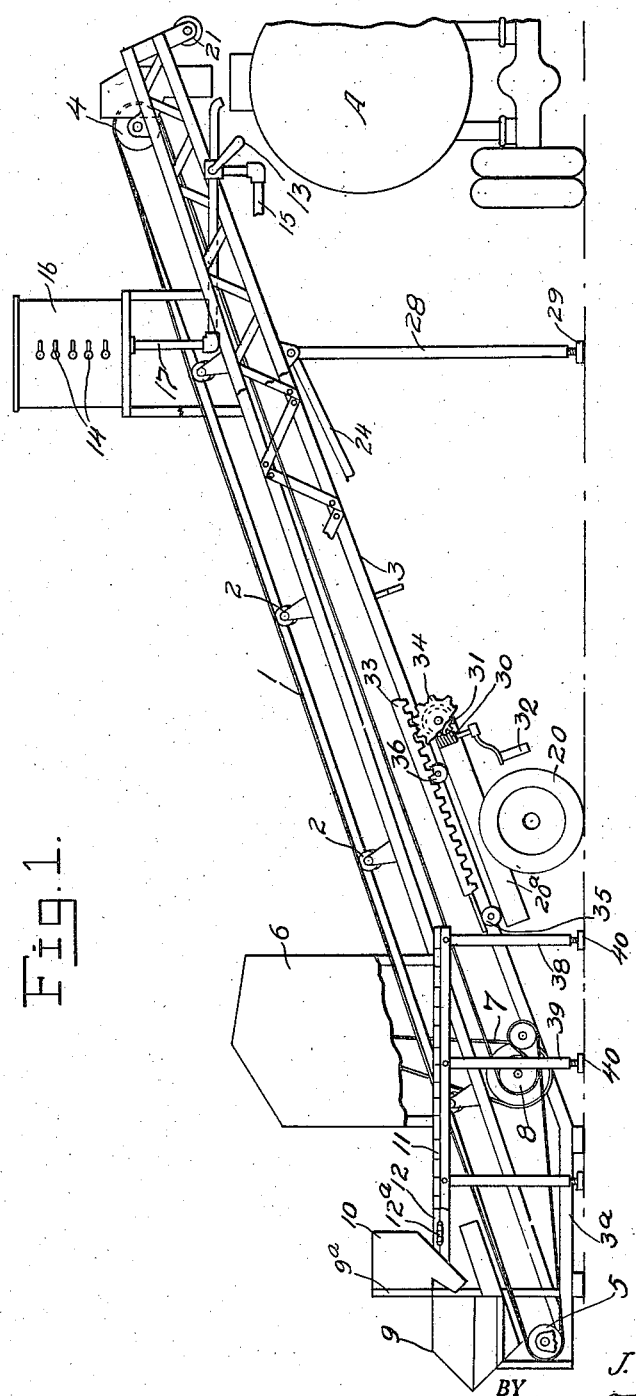

Patented Jan. 17, 1939

2,144,360

UNITED STATES PATENT OFFICE 2,144,360

PORTABLE CONVEYER

John Calvin Buckbee, Los Angeles, Calif.

Application June 5, 1935, Serial No. 25,063

1 Claim. (Cl. 198—233)

This invention relates to conveyers and has particular reference to improvements in portable batch belt conveyers.

The present invention is capable of adaptation to many purposes. But, as it is primarily intended for use in connection with the preparation of concrete mixtures, the following is a description of a device particularly adapted for such use.

The general object of the invention is to provide a conveyer which may readily be transported from place to place and which, upon arrival at its destination, may quickly be set up and adjusted for operation.

It is a further object of the invention to provide convenient means for receiving the various materials which combine to form the concrete mixture and to direct such materials to the belt of the conveyer.

Another object is the provision of means for delivering correctly measured quantities of water to the materials discharged from the conveyer.

Other objects of the invention reside in the particular means of adjusting the structure for operation and of readjusting the device for transportation, all of which will be made evident hereinafter.

Referring to the drawings, in which a preferred form of the invention is shown,

Fig. 1 is a side elevation of a conveying device embodying the invention as it appears in position for operation, parts having been broken away for the sake of clearness, Fig. 2 is a substantially corresponding side view of the device, showing the conveyer adjusted and fitted for transportation, and, Fig. 3 is a partial end elevation of the structure in the position illustrated in Fig. 1.

The numeral 1 denotes a conveyer belt which is held supported on series of rollers 2, the rollers of each series being inclined toward the center of the belt to provide in the belt a gutter for better conveying the materials, all as usual in practice.

The belt is held suspended within a frame 3, by means of pulleys 4 and 5, and suitable means is provided for driving the conveyer properly to advance and to discharge the materials. As conveyer driving mechanisms of various types are commercially well known, such mechanism is here merely indicated by a housing 6, within which suitable driving mechanisms are installed. A belt 7 is shown extending from the power plant of this housing to illustrate connecting means to drive the conveyer through a succession of pulleys 8.

The conveyor frame 3 is, in Fig. 1, shown rising diagonally to a position for convenient discharge into the intake opening of a mixing truck A, such as commonly employed in large concrete construction operations. The housing 6 is shown mounted at the bottom of this rising frame portion, and it is noticed that the frame extends horizontally beyond the housing, substantially as indicated at 3ª, to form a level base upon which the receiving end of the conveyer firmly rests. Hoppers are provided at this inner end of the frame, one of which, designated by the numeral 9, is shaped to receive the aggregates which usually are carried to the conveyer in dump trucks fitted to discharge predetermined batches of the material into this hopper. A second hopper 10, is shown directly in front of a splashboard 9ª of the first hopper, and the bottoms of both hoppers are shaped with spouts directed to deposit the materials on the conveyer belt.

At each side of the frame, and extending alongside the space occupied by the hoppers and the housing, is a platform, 11, 12, which platforms serve as storing spaces for bags of cement. When the device is in operation, it is customary to station a man on each platform to open the bags and to discharge the cement into the hopper 10 in predetermined proportion to the aggregates dumped into the hopper 9. So long as these platforms are kept supplied with cement bags, it is seen that the device of my invention is capable of continuous operation and that the operating capacity of the device is limited only to the speed with which delivery and receiving trucks can be exchanged. And when each truck is immediately followed by another, the dwell between operations is merely sufficient for the men on the platforms to open the bags ready for discharge into the hopper.

A water tank 16 is shown mounted on the frame near the discharge end of the conveyer, and it is fitted with a drain pipe 17 for discharging measured quantities of water into the mixing truck A. A valve 13 is placed near the discharge end of this pipe, and within easy reach of the driver of the truck, for controlling the supply of water required with each batch of dry mixture delivered to the mixing truck.

Dump trucks employed to carry aggregates for making concrete usually are divided into compartments, each holding an equal quantity of the material, and fitted with gates permitting the discharge of one batch at a time. With each batch of aggregates, a proportionate number of bags of cement is dumped on to the conveyer, and it is furthermore necessary that a proportionate volume of water be added to this mixture as it is discharged into the mixing truck. While the water tank preferably is made large enough to furnish sufficient water for as large a batch of material as the devices employed can conveniently handle, provision should be made for delivering water in correct proportion to the batch discharged. To this end, a number of vertically distributed apertures are made in the side of the tank, and a pet cock 14 is seated to close each aperture. Each cock is positioned to represent the surface of a given volume of water. When therefore the quantity of the dry material in each batch is determined, it is only necessary to open the cock representing the volume of a correct proportion of water, permitting thereby any excess of water to waste through this open cock. A pipe, carrying water under pressure, should be provided to replenish the water supply within the tank. The valve 13 may, if desired, be of the three-way type, in one position to connect the tank with the supply pipe and in the other to discharge the water from the tank into the mixing truck. Or any other suitable arrangement may be substituted, the important point being to provide means capable of refilling the tank while a batch of material is advanced on the conveyer, in combination with means for limiting the contents of the tank to be discharged to a predetermined volume.

The weight of the power housing 6 and of the hoppers is sufficient to maintain the device firmly in operative position, as shown in Fig. 1. To facilitate transportation, however, the conveyer is shown mounted on a wheel truck 20, the wheel axle of which serves as a fulcrum on which the conveyer may be swung into the horizontal position indicated in Fig. 2. The outer end of the conveyer is fitted with elements, such as a roller 21, which rests on a plate 23 of a hauling truck 22, when the conveyer is in transit. A draw bar 24, which at one end is shown pivotally mounted on the conveyer frame, is thereupon hitched on to the truck for transferring the device to a new location.

Because of the great weight of the power mechanism and of the hoppers, it is not so easy to swing the conveyer into horizontal position. Nor would the device be well balanced in this position, as a consequence of which the strain, during transportation, might be sufficient to cause a break in the connections or at least to result in damage to the device as well as prove inconvenient in turning street corners because of the long rear overhang. In order to correct this condition, I have provided means for adjusting the conveyer lengthwise on the wheel truck 20. This adjustment is shown effected by turning a hand crank 32, the shaft of which carries a worm 30, and this worm meshes with a wormwheel 31, all of which elements are mounted on the frame 20$^a$ of the wheel truck. A rackbar 33 is shown fastened to the underside of the conveyer frame and it is in mesh with a gear wheel 34, which in turn is mounted to rotate with the wormwheel 31.

By turning this crank, it is possible to advance the conveyer on the wheel truck and thereby to balance the device on the truck as best suited to hauling conditions. It is advisable to introduce antifriction rollers 35, 36, between the truck body and the conveyer frame, in order to facilitate this adjustment. These devices are, however, merely illustrative of simple means of balancing the conveyer on the wheel truck, as best suited to operating and transportation conditions, and more elaborate means may be employed in practice.

It is advisable to provide a support to carry the weight of the filled water tank and also to reduce the weight on the wheel truck 20, and such support is here shown to consist of an ordinary A-frame 28, pivotally mounted on the conveyer frame and provided with adjustable feet 29 to accommodate the support to unevennesses of the ground surface on which the device is stationed. This support may be folded up against the conveyer frame during transportation, substantially as shown in Fig. 2.

The sidewise overhanging platforms 11, 12, which are so indispensable to the convenient and economical use of the device, would hinder transportation along public highways, if not to make it so expensive as to render its transportation commercially impossible. But, by pivotally mounting these platforms on the conveyer frame, it is possible to fold them alongside the conveyer frame, like drop leaves of a table, when not in use. To this end, I have shown the platforms hung on hinges 11$^a$, 12$^a$, and a series of supports, or legs 38, 39 are pivotally mounted along the outer side edges of the platforms. These legs are, when the conveyer is to be moved, first folded against the underside of the platforms, as indicated in Fig. 3, to permit the latter to drop into the position indicated in dotted outline. Each leg is conveniently fitted with an adjustable foot 40, better to accommodate the legs to a rough and uneven ground surface.

From the foregoing description, the objects and advantages of the invention should be clear to those versed in the art. While I have described means for conveying concrete materials, I do not wish to be limited in this particular. Nor do I confine myself to a belt conveyer or to the limiting phrases hereinbefore employed, but reserve right to such modifications as come within the scope of the appended claim.

I claim:

A portable conveyer comprising, a wheel truck, a conveyer lengthwise adjustable on said truck to tilt the conveyer into operating position, a pivot on the underside of said conveyer, a frame on said pivot movable into engagement with the ground for supporting the overhanging portion of the conveyer, a draw-bar on said pivot for attachment to a hauling vehicle, a roller on the end of the conveyer for contact with the hauling vehicle to eliminate friction due to relative movement of the conveyer and the vehicle, and means on the conveyer for holding said frame and the said draw-bar folded close to the conveyer when not in use.

JOHN CALVIN BUCKBEE.